US008807079B2

(12) United States Patent
Nilsson (10) Patent No.: US 8,807,079 B2
(45) Date of Patent: Aug. 19, 2014

(54) MILKING PARLOUR AND METHOD FOR OPERATING THE SAME

(75) Inventor: Mats Nilsson, Tumba (SE)

(73) Assignee: DeLaval Holding AB, Tumba (SE)

(*) Notice: Subject to any disclaimer, the term of this patent is extended or adjusted under 35 U.S.C. 154(b) by 275 days.

(21) Appl. No.: 13/256,283

(22) PCT Filed: Apr. 14, 2010

(86) PCT No.: PCT/EP2010/054911
§ 371 (c)(1),
(2), (4) Date: Sep. 13, 2011

(87) PCT Pub. No.: WO2010/119079
PCT Pub. Date: Oct. 21, 2010

(65) Prior Publication Data
US 2012/0000427 A1    Jan. 5, 2012

(30) Foreign Application Priority Data
Apr. 16, 2009   (EP) .................................... 09158092

(51) Int. Cl.
*A01J 5/017* (2006.01)

(52) U.S. Cl.
USPC ................... 119/14.02; 119/14.04; 119/14.08

(58) Field of Classification Search
USPC ................................. 119/14.03, 14.04, 14.08
See application file for complete search history.

(56) References Cited

U.S. PATENT DOCUMENTS

| 6,050,219 | A | 4/2000 | van der Lely | |
|---|---|---|---|---|
| 8,205,573 | B2* | 6/2012 | Eriksson et al. | 119/14.02 |
| 8,281,743 | B2* | 10/2012 | Axelsson et al. | 119/14.02 |
| 8,387,565 | B2* | 3/2013 | Axelsson et al. | 119/14.02 |
| 8,505,483 | B2* | 8/2013 | Axelsson | 119/14.04 |
| 8,505,484 | B2* | 8/2013 | Andersson et al. | 119/14.04 |
| 2012/0000427 | A1* | 1/2012 | Nilsson | 119/14.02 |
| 2013/0061807 | A1* | 3/2013 | Axelsson | 119/14.04 |

FOREIGN PATENT DOCUMENTS

| EP | 2 060 171 A1 | 5/2009 |
|---|---|---|
| JP | 9502618 A | 3/1997 |
| JP | 11507248 A | 6/1999 |
| JP | 11276000 A | 10/1999 |
| RU | 2 244 417 C2 | 1/2005 |
| SU | 1281219 A2 | 1/1987 |
| SU | 1777728 A1 | 11/1992 |
| WO | 94/22292 A1 | 10/1994 |
| WO | 9601041 A1 | 1/1996 |
| WO | 9737530 A1 | 10/1997 |
| WO | 00/74472 A1 | 12/2000 |
| WO | 2007/142586 A1 | 12/2007 |

OTHER PUBLICATIONS

International Search Report, dated Feb. 23, 2011, from corresponding PCT application.
Supplementary International Search Report, dated Aug. 4, 2011, from corresponding PCT application.
Japanese Office Action, dated Aug. 2, 2013, from corresponding PCT application.

* cited by examiner

*Primary Examiner* — Kristen C Hayes
(74) *Attorney, Agent, or Firm* — Young & Thompson (57) ABSTRACT

An apparatus for milking an animal and provides a milking parlor includes first and second robotic manipulation devices and a plurality of milking stalls provided on a platform moveable relative to the robotic manipulation devices. The robotic manipulation devices are positioned so that each of the robotic manipulation devices is able to simultaneously service two neighboring milking stalls on the platform.

19 Claims, 4 Drawing Sheets

MILKING PARLOUR AND METHOD FOR OPERATING THE SAME

The present invention relates to a milking parlour and a method for operating the same and particularly, but not exclusively, to a rotary milking parlour for milking an animal, such as a cow, and to a method for operating the same.

There are various types of milking parlour known in the dairy industry and the present invention is of particular relevance to what is commonly referred to as a rotary milking parlour. This type of parlour is provided with a comparatively large number of milking stalls arranged in a circular configuration on a rotating annular platform and is of particular use in handling a large number of animals. The platform rotates at a relatively low constant speed so that a cow may readily step onto the platform from a stationary holding bay and thereby gain access to a stall. If deemed necessary by an operator, the rotary movement of the platform may be stopped momentarily in order to allow a cow sufficient time to enter (or exit) the platform. The continued rotation of the platform then moves the stall into a position where an operator can perform certain tasks (such as teat cleaning and placement of teat cups on the teats) so as to allow the milking process to begin. The speed of rotation is such that the milking process will have been completed by the time a stall has moved from the cow entry position (where a cow gains entry onto the platform) to a cow exit position (where a cow is permitted to leave the platform). The cow entry and exit points are adjacent one another so as to maximise the time a cow spends in the milking stall.

It will be understood that cows may constantly enter and exit a rotary parlour without necessarily stopping the platform rotation and this allows for a large number of cows to be handled. It will be also understood that the movement of the platform results in cows being brought to an operator in turn. The operator is therefore able to remain in one location and concentrate on essential milking tasks without interruptions.

There are two main types of rotary milking parlour system, which may be referred to as the Parallel Rotary system and the Herringbone Rotary system.

In a Herringbone Rotary system, a cow stands in a stall facing diagonally towards the outside of an annular rotating platform, in the general direction of rotation. One or more operators stand on the inside of the rotating platform and are thereby provided good access to the side of each cow. Milking equipment is positioned alongside each cow on the inside edge of the platform.

In a Parallel Rotary system, a cow stands in a stall of a rotating platform so as to face radially inward towards the centre of rotation of the platform. Operators stood outside the rotating platform are then able to work from the rear of each cow as the cow passes in turn. Because the cows are positioned side by side, the parallel rotary system allows more cows to be accommodated in the same space.

In each of these types of rotary parlour, each milking stall is provided with a cluster of four teat cups. These teat cups are attached to the teats of a cow located within the stall so as to allow said cow to be milked. Once the milking process has been completed, an automatic retraction system is typically used to remove the four teat cups simultaneously from the teats. Such a system comprises a cord which is attached to the teat cup cluster and which is retracted automatically at an appropriate time so as to pull the teat cup cluster from the cow.

A problem associated with rotary milking parlours is that an operator only has a limited amount of time in which to service a milking stall before the milking stall moves beyond the reach of the operator. An operator may service a milking stall in a number of ways, for example, an operator will typically service a milking stall by moving teat cups from a storage position into a position where they are attached to the teats of a cow stood within the milking stall. Although a teat cup cluster will be typically attached to the teats of a cow before the milking stall has moved a significant distance, unpredictable events such as movement by an unsettled cow can significantly delay the teat cup attachment process. This is not necessarily problematic when a human operator services the milking stalls because the operator can walk with the rotating platform and remain with the particular stall experiencing the delay. However, delays in servicing a stall can be problematic in circumstances where a robot arm is being used for the servicing activity. This is because the robot arm has a fixed position within a milking parlour and so a milking stall will tend to move quite rapidly beyond its reach. This problem is also a particular issue when the speed of the milking stalls is comparatively high. This may be found in large rotary parlours where the linear tangential speed of a stall will be comparatively high for a given angular speed because of the comparatively large platform radius.

A first aspect of the present invention provides a milking parlour comprising at least first and second robotic manipulation devices and a plurality of milking stalls provided on a platform moveable relative to the robotic manipulation devices; wherein the at least first and second robotic manipulation devices are positioned so as to be capable of simultaneously servicing neighbouring milking stalls on the platform; the parlour being characterised in that each one of the at least first and second robotic manipulation devices is operable to attach, to the same animal in a milking stall, a subset of a total required number of teat cups to be attached to the teats of said animal in the milking stall.

The robotic manipulation devices thereby attach a predefined number of the total required number of teat cups. Accordingly, it will be understood that any particular animal has teat cups attached to its teats by at least two robotic manipulation devices.

The teat cups may be cleaning cups (for cleaning the teats of an animal), or milking cups (for milking an animal). Accordingly, the devices may be used purely for cleaning, purely for milking, or for a combination of these processes. For example, a first pair of robotic manipulation devices could be dedicated to cleaning the teats of an animal by attaching and removing cleaning cups, and a second pair of robotic manipulation devices could be used to attach the milking teat cups for milking. Different combinations and operations are also possible.

By requiring each robotic manipulation device to attach only a subset of the total required number of teat cups, the time taken for each robotic manipulation device to service a milking stall is reduced. The benefit is greatest if one robotic manipulation device is provided per operation for each teat of the animal, but benefits are also provided if, for example, one robotic manipulation device per pair of teats is provided.

Previous systems have sought to address the above problem of delays in servicing a stall through the provision of a pair of robotic manipulation devices, each of which attaches all necessary teat cups to an animal. In use, the robotic manipulation devices of such prior art systems simultaneously service adjacent stalls. This leads to the crossing of robotic arms as one robotic manipulation device, having finished its servicing activity, has to reach back past a further robotic manipulation device which may still be servicing an adjacent stall. In order to prevent collision of the two robotic manipulation devices, complicated extendible robot arms with several axes of movement and complex control systems are required.

In the present invention, the first robotic manipulation device may comprise means for carrying a teat cup and means for sensing the location of a teat relative to said teat cup carrying means, and the second robotic manipulation device may comprise second means for carrying a teat cup and means for sensing the location of a teat relative to said second teat cup carrying means, wherein the relative position of said sensing means of the first robotic manipulation device to the teat cup carrying means of the first robotic manipulation device is different to the relative position of said sensing means of the second robotic manipulation device to the teat cup carrying means of the second robotic manipulation device.

The sensing means of the first robotic manipulation device may be arranged to sense in a first direction relative to the first robotic manipulation device and the sensing means of the second robotic manipulation device may be arranged to sense in a second direction relative to the second robotic manipulation device, wherein said first and second relative directions are opposite one another.

Ideally, the first and second robotic manipulation devices are positioned relative to the platform so that, in use, said devices attach teat cups to the teats of an animal from the rear of said animal, and wherein, in use, the sensing means of the first robotic manipulation device senses in a direction from said device generally towards the front of the animal and the sensing means of the second robotic manipulation device senses in a direction from said device generally towards the rear of the animal.

The first robotic manipulation device may be operable to attach a teat cup to at least one of the rear teats of the animal. The second robotic manipulation device may be operable to attach a teat cup to at least one of the front teats of the animal.

It is also preferable that the sensing means of the first robotic manipulation device is positioned on one side of the teat cup carrying means of the first robotic manipulation device and oriented so as to sense in the general direction of said teat cup carrying means, and the sensing means of the second robotic manipulation device is positioned on one side of the teat cup carrying means of the second robotic manipulation device and oriented so as to sense in the general direction of said teat cup carrying means of the second robotic manipulation device, and wherein said side of the first teat cup carrying means is a different side to said side of the second teat cup carrying means.

The milking parlour may comprise two of said first robotic manipulation devices and two of said second robotic manipulation devices.

Furthermore, each sensing means may comprise a camera.

In the present invention, one robotic manipulation device will never have to reach back past a further robotic manipulation device in order to service a stall. The stalls are serviced in sequence as they pass each robotic manipulation device. As such, the occasions where two robotic manipulation devices cross with one another are minimised. This advantageously allows for the use of far simpler robot arms, along with more straightforward control systems. However, it is still possible to use more complex robot arms to provide further advantages as described below.

A second aspect of the present invention provides a method of operating a milking parlour according to the first aspect of the present invention; the method comprising the step of controlling the plurality of robotic manipulation devices so that said devices simultaneously service different neighbouring milking stalls on the platform.

A milking parlour is described below as comprising four robotic manipulation devices and a plurality of milking stalls; wherein each robotic manipulation device is operable to attach a single teat cup to an animal to be milked. Information regarding the activity of a robotic manipulation device is sent electronically from said device. Information regarding one of said robotic manipulation devices may be communicated electronically to the other of said robotic manipulation devices. Ideally, information regarding the activity of said four robotic manipulation devices may be exchanged electronically between said devices. Furthermore, the information may comprise data recording the current real-time position of a robotic manipulation device and/or the number of teat cups successfully attached to a cow positioned in a milking stall currently being serviced by a robotic manipulation device. Ideally, the plurality of milking stalls are provided on a platform moveable relative to the robotic manipulation devices.

A milking parlour is described below as comprising a first robotic manipulation device and a plurality of milking stalls provided on a platform moveable relative to the robotic manipulation device; and the parlour further comprising an entrance preventing, in use, entry to the platform of more than one animal at any one time; and the parlour being characterised by a second robotic manipulation device wherein the first and second robotic manipulation devices are positioned so as to be capable of simultaneously servicing neighbouring milking stalls on the platform.

Also described below is a method of operating a milking parlour having a plurality of robotic manipulation devices, a plurality of milking stalls provided on a platform moveable relative to the robotic manipulation devices, and an entrance preventing, in use, entry to the platform of more than one animal at any one time; the method comprising the step of controlling said robotic manipulation devices so that said devices simultaneously service different neighbouring milking stalls on the platform.

It will be understood that through use of the present invention, a robotic manipulation device will require less time to service a milking stall. It will also be appreciated that the present invention thereby allows the speed of a platform stall to be increased.

Further advantageous optional features of the invention are set out in the appended dependent claims.

In one embodiment, information regarding the activity of one robotic manipulation device is communicated electronically to another robotic manipulation device, and may be exchanged electronically between said two robotic manipulation devices.

An embodiment of the present invention will now be described with reference to the accompanying drawings, in which.

Figure 1:
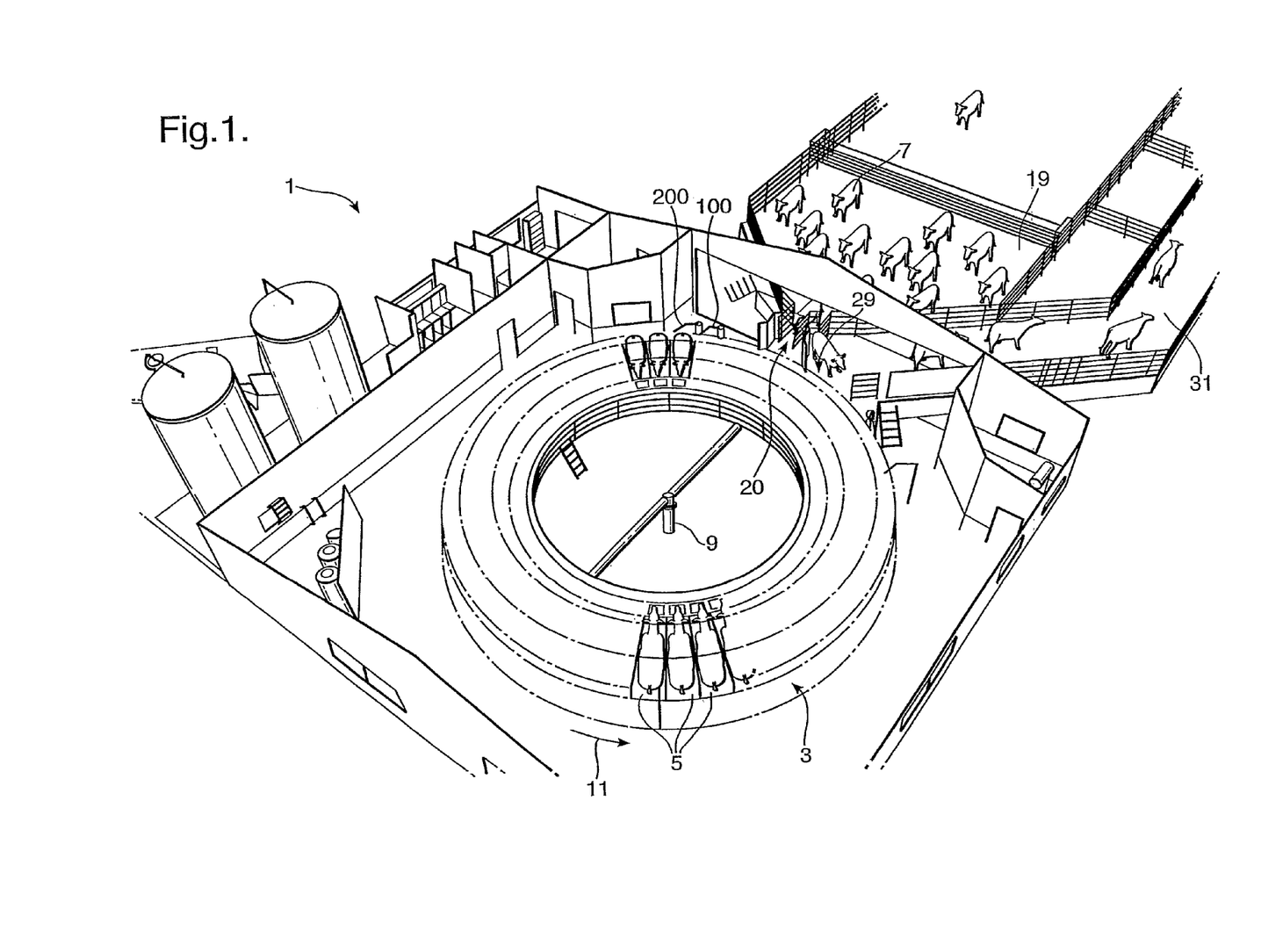
FIG. 1 is a schematic perspective view of a parallel rotary parlour according to the present invention.

A parallel rotary parlour 1 according to the present invention is shown in FIG. 1 of the accompanying drawings. The parlour 1 comprises a rotatable platform 3 having an annular shape and being provided with fifty milking stalls 5 arranged side by side circumferentially along the platform 3. Since the parlour 1 is of a parallel rotary type, the stalls 5 are arranged so that a cow 7 to be milked stands in a stall 5 facing radially inwards towards the centre 9 of rotation of the platform 3. In use, the platform 3 is rotated by suitable drive means in an anti-clockwise direction as indicated by arrow 11.

With reference to FIG. 1, it will be understood that cows 7 to be milked congregate in a holding bay 19 and walk onto the platform 3 one by one at a stall entry point 20. The entry point 20 comprises an animal walk way having a width substantially equal to that of a milking stall 5. This width is sufficient for an animal, such as a cow, to comfortably walk through the walk way and into a stall 5, but is not so great as to allow the passage of two animals side-by-side. In this way, animals are prevented from entering stalls 5 of the platform 3 simultaneously. It will be understood that the speed of rotation of the platform 3 is sufficiently low for a cow 7 to step onto the platform 3 and walk into a passing stall 5. It will also be understood that, once a cow 7 has entered a stall 5, further rotation of the platform 3 closes the stall 5 so as to prevent the cow 7 from backing out of the stall 5. Each stall 5 is provided with four teat cups connected to a conventional milking system by means of hoses. As will be explained in more detail below with reference to FIGS. 2 and 3, these teat cups 21a, 21b, 21c, 21d are automatically attached to the teats 23a, 23b, 23c, 23d of a cow by means of four robot arms 100, 200, 300, 400 which are moved by an electronic control system. Once the teat cups 21 are attached to the teats 23, the cow 7 is milked in a conventional fashion whilst the platform 3 continues to rotate. Once milking has been completed, the teat cups 21 are removed from the teats 23 by means of an automatic teat cup retraction system (not shown) which pulls on the hose 20 associated with each teat cup 21 and withdraws the teat cups 21 back into a teat cup magazine 27.

Figure 2:
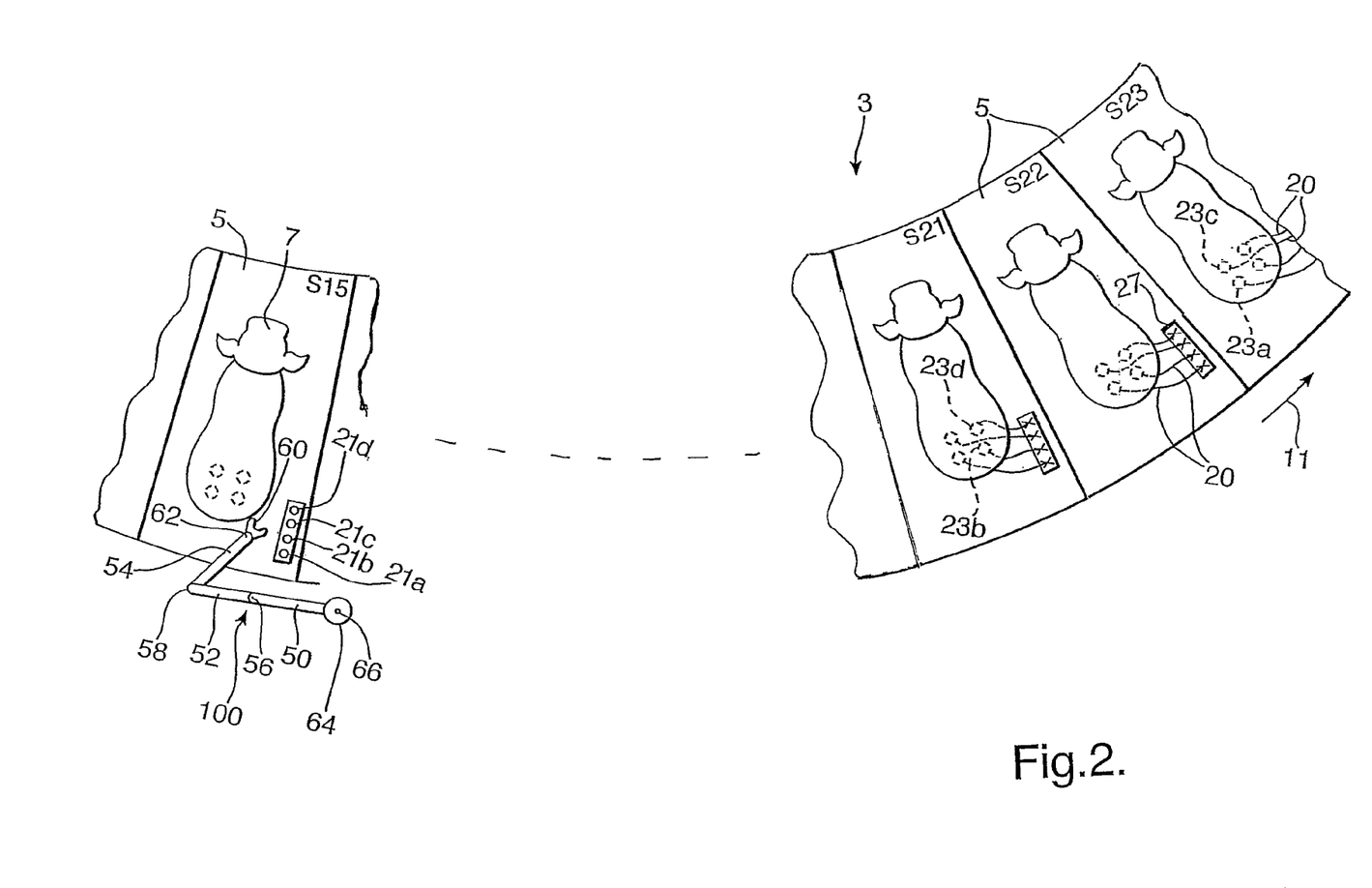
FIG. 2 is a schematic part plan view of the rotating platform of the rotary parlour shown in FIG. 1, showing one stall of the platform adjacent a robot arm prior to the attachment of teat cups to an animal and a further portion of the platform where the teat cups have been attached.

As shown in FIG. 2, each stall 5 is provided with a teat cup magazine 27 which comprises four recesses into which the four teat cups 21 locate when not in use. Each magazine 27 is located adjacent the entrance of the associated stall 5 so as to not unduly hinder access by a cow 7 to the stall 5 and so as to be positioned adjacent the rear of a cow 7 stood in the stall. The magazine 27 will therefore be understood to hold the teat cups 21 in a known storage position which is readily accessed by each robot arm 100, 200, 300, 400 and which is sufficiently close to the teats 23 of the cow 7 to allow ready movement of the teat cups 21 to the teats 23 from the magazine 27.

Once the teat cups 21 have been retracted into the teat cup magazine 27, the milking stall 5 in which the cow 7 is located will shortly thereafter move to a stall exit point 29 (see FIG. 1). At the exit point 29, a stall 5 is arranged in an open configuration so that a cow 7 located therein may back out of the stall 5 and leave the parlour 1 by means of an exit walkway 31.

As mentioned above, the rotary parlour 1 of the present invention is provided with an automated system for attaching teat cups 21 to the teats 23 of a cow 7 to be milked. This automated system comprises at least two, and preferably four robot arms 100, 200, 300, 400 and an electronic control system. The electronic control system allows movement of the robot arms 100, 200, 300, 400 to be coordinated with the rotary movement of the platform 3. Suitable means for monitoring the rotary speed and position and the direction of rotation of the platform 3 is provided (not shown) and this information is used by the control system in order to ensure accuracy in coordinating the movements between the robot arms 100, 200, 300, 400 and associated stalls 5.

Figure 3:
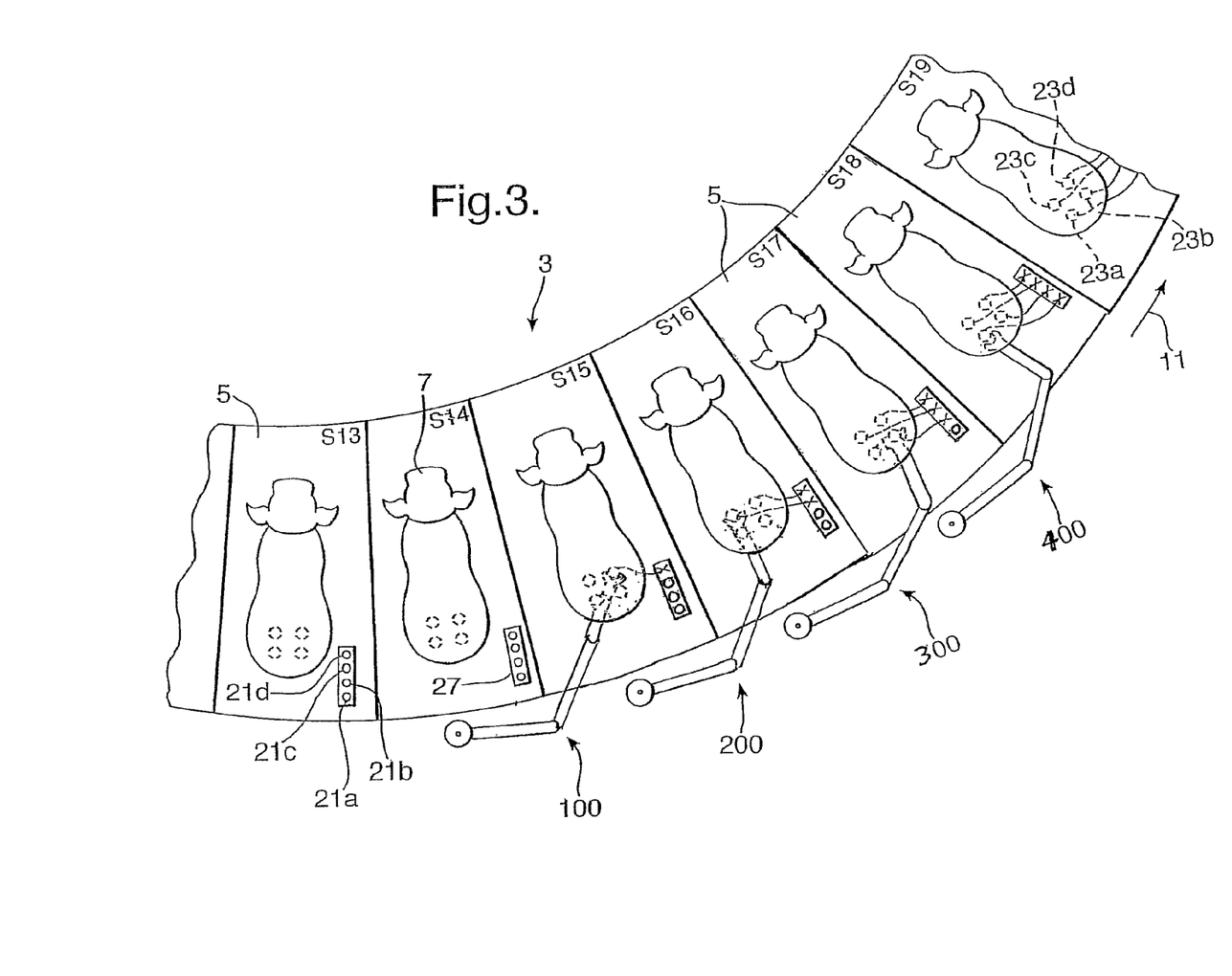
FIG. 3 is a schematic part plan view of the rotating platform of the rotary parlour shown in FIG. 1 during rotation, with each of four robot arms performing its own function.

In FIGS. 2 and 3 of the accompanying drawings, a number of milking stalls (numbered S13 to S23) are shown moving past the robot arms 100, 200, 300, 400. Alternative arrangements of robot arm may be provided and the schematic example shown in FIGS. 2 and 3 is provided merely for the purposes of illustrating the operation of the present invention.

Referring specifically to FIG. 2, a first robot arm 100 is shown ready to begin its servicing activity on stall numbered S15. FIG. 2 also shows a number of stalls (numbered S21 to S23) from a part of the platform 3 which has already moved beyond all four robot arms 100, 200, 300, 400, and thus where the teat cups 21a, 21b, 21c, 21d are attached to the teats 23a, 23b, 23c, 23d of a cow 7. The hose 20 associated with each teat cup 21 is also clearly shown in stalls numbered S21, S22 and S23. Only a single robot arm is shown in FIG. 2 for reasons of simplicity. However, it will be appreciated that the features referenced in FIG. 2 in relation to the first robot arm are also present in each of the four robot arms 100, 200, 300, 400 shown in FIG. 3, and as such the following description of features will be made with reference to all four robot arms 100, 200, 300, 400.

Each robot arm 100, 200, 300, 400 comprises first, second and third arms 50, 52, 54, rotatably connected to one another by elbow joints 56, 58, and teat cup carrying means. In the present embodiment, the teat cup carrying means is a teat cup gripper 60 pivotably connected to the third arm 54 at a wrist joint 62. However, in an alternative embodiment (not shown), a robot arm 100, 200, 300, 400 is provided with means for carrying two or more teat cups simultaneously. This carrying means may, for example, comprise an element having two recesses into each of which a teat cup may be received. Each robot arm 100, 200, 300, 400 also comprises a swivel unit 64 from which the first arm 50 extends. The first arm 60 is rotatable about a central axis 66 by means of the swivel unit 64.

The operation of the robot arms 100, 200, 300, 400 is shown in FIG. 3. The swivel units 64 of each robot arm 100, 200, 300, 400 are circumferentially spaced from one another by a distance equal to the width of a milking stall 5. Accordingly, it will be understood that the four robot arms 100, 200, 300, 400 operate to simultaneously service neighbouring stalls 5 of the platform 3. As shown in 3, each robot arm 100, 200, 300, 400 is operable to move a particular teat cup 21a, 21b, 21c, 21d from a magazine 27 into attachment with a corresponding teat 23a, 23b, 23c, 23d of a cow 7.

In this regard, once a particular teat cup magazine 27 moves within reach of the gripper 60 of the first robot arm 100, the gripper 60 grasps a first teat cup 21d and moves said teat cup to an estimated position of a first teat 23d. The precise position of the first teat 23d is then determined in a conventional manner using an appropriate sensing device. Once the teat 23d has been accurately located, the robot arm 100 then attaches the teat cup 21d to the teat 23d. As the stall 5 and its magazine 27 pass each of the remaining robot arms 200, 300, 400 each robot arm 200, 300, 400 in turn attaches one of the remaining three teat cups 21c, 21b, 21a. The process is occurring continuously as the platform 3 rotates such that, as shown in FIG. 3, as the first robot arm 100 is attaching teat cup 21d to the respective teat 23*d* of the cow 7 in stall numbered S15, the second robot arm is simultaneously attaching teat cup 21*c* to teat 23*c* of the cow 7 in stall numbered S16, and so on. Accordingly, once a stall 5 has moved past all four robot arms, all four teat cups 21 will have been applied to the teats 23 of a cow 7 in that particular stall 5.

It will be understood that the provision of the four robot arms 100, 200, 300, 400 operating as described above means that each robot arm only needs to perform a single operation in order to apply one of four teat cups 21*a*, 21*b*, 21*c*, 21*d*. As such, the time required for each robot arm 100, 200, 300, 400 to complete a servicing activity is reduced by a factor of four. This allows each robot arm 100, 200, 300, 400 to remain stationary relative to the platform 3 without the risk of a stall 5 moving out of range before the servicing activity is complete. The rotation speed of the platform can also be increased.

Due to the reduced servicing time, the operating range of each robot arm need only be sufficient to be capable of servicing only the milking stall positioned in its immediate vicinity. However, it is beneficial for each robot arm 100, 200, 300, 400 to be able to extend a sufficient distance to also service a neighbouring milking stall, as shown in FIGS. 2 and 3. With reference to FIG. 3 in particular, the milking shown includes robot arms 100, 200, 300, 400 which extend sufficiently to service not only a milking stall located immediately in front of each said arm, but also the two milking stalls located on either side of said stall. Specifically, it will be appreciated that the milking stall numbered S14 is positioned immediately adjacent the first robot arm 100. The swivel unit 64 of the first robot arm 100 is located on an extended centre line of the milking stall numbered S14 (i.e. an imaginary radial line positioned midway between the radial side walls of the stall). With the first robot arm 100 and platform 3 in this relative position as shown in FIG. 3, the working/operating range of the first robot arm 100 is sufficient to allow said arm to service a milking stall as it moves from the position of the milking stall numbered S13 in FIG. 3 to the position of the milking stall numbered S15. Indeed, the first robot arm 100 is extendable so as to continue to service a milking stall as it moves beyond the position of the milking stall numbered S15 in the direction of arrow 11 as shown in FIG. 3. It will be appreciated that the first robot arm 100 has a working/operating range spanning the width of three milking stalls (numbered S13, S14 and S15 in FIG. 3).

To further clarify, with regard to FIG. 2, it will be seen that the first robot arm 100 is ready to begin servicing the milking stall numbered S15 before this stall has reached the swivel unit 64 of the first robot arm 100. It will be understood that the stall numbered S16 (not shown), and in particular its magazine 27, will at this stage be within range of the second robot arm 200 (not shown). Each robot arm 100, 200, 300, 400 therefore has an extended period of time in which to service a stall 5 as a consequence of the increased range of each robot arm 100, 200, 300, 400. The combination of this increased operational range with the reduced time required for each arm to complete its own servicing activity further reduces delays in servicing a stall, even under difficult circumstances.

It will be appreciated that, in servicing stalls simultaneously, the robot arms 100, 200 may theoretically undertake the same actions at the same time. In other words, each robot arm 100, 200, 300, 400 may, for example, attach their respective teat cups 21*d*, 21*c*, 21*b*, 21*a* to a teat 23 in the same moment. However, in practice, the robot arms are likely to be delayed to differing extents (typically because of animal movements) so that, although different stalls are simultaneously serviced, the robot arms 100, 200, 300, 400 are not synchronised in their movement. Indeed, it is to be emphasised that a second robot arm 200 may be delayed to such an extent that the first robot arm 100 begins servicing its next stall before the second robot arm 200 has completed its servicing tasks and is also able to move to its next stall. For example, the robot arms 100, 200, 300, 400 in FIG. 3 are illustrated as attaching their respective teat cups to a teat at the same time, however in practice it will be appreciated that the first robotic arm 100 may well have encountered fewer delays in its teat cup attachment than, for example, the second robot arm 200 and would therefore have already begun servicing its next milking stall numbered S14. Accordingly, the two robot arms 100, 200 would then be simultaneously servicing milking stalls numbered S14 and S16.

It will therefore be appreciated that the robot arms 100, 200, 300, 400 operate entirely independently of one another in that one robot arm does not reduce its rate of teat cup attachment in order to keep pace with a delayed robot arm. Nevertheless, the control system coordinates the movement of the robot arms 100, 200, 300, 400 so as to ensure the robot arms 100, 200, 300, 400 do not collide with one another. It will be appreciated that the risk of a collision is comparatively high when the stalls being serviced require the robot arms 100, 200, 300, 400 to cross one another. As discussed above, the present invention does not require one arm to reach past another to service a further stall, so an undesirable crossing of arms from such an action does not occur. However, the second robot arm 200 in FIG. 3 may well, in practice, experience fewer delays in teat cup attachment than the first robot arm 100 and therefore be able to begin servicing its next stall (the milking stall numbered S15) before the first robot arm 100 has completed its servicing of the same milking stall. In these circumstances, two robot arms 100, 200 will be operating in the same area, and may have to cross one another in simultaneously servicing the milking stall numbered S15. This crossing can be minimised by appropriate selection of which robot arm is associated with which teat. For example, in FIG. 3, the crossing of arms 100, 200 would be less likely if the first arm 100 were associated with teat 23*c* and the second arm 200 were associated with teat 23*d*. However, other considerations such as access to the relevant part of the magazine 27 and potential tangling of the tubes 20 mean that an ideal relationship will not always be possible, so some crossing may still occur. The electronic control system and method used to avoid collision of the two robots 100, 200 is described in greater detail below.

In a further embodiment, the electronic control system may be adapted to allow one robot arm 100, 200, 300, 400 to perform the service operation typically conducted by a further robot arm 100, 200, 300, 400. A robot arm may operate in this way temporarily, for a short period of time, in circumstances where said further robot arm has been so delayed in its teat cup attachment that a stall has moved out of its range before its servicing activity is complete. For example, if the first robot arm 100 fails to attach its teat cup 21*d* in time, this can be detected and the operation can be instead performed by the second robot arm 200 either before or after it has attached its own teat cup 21*c*. Such a coordinated servicing of the same milking stall may obviate the need to reduce platform rotation speed. Given the benefits of the invention described above, this scenario is less likely than with prior art systems, but may still occur in extreme cases or where one robot arm fails. A similar operation will also be useful in the event that a cow 7 manages to kick off a teat cup 21 after it has been attached. The disconnection can be detected and a further robot arm may then re-apply the teat cup in question. Once the assistance has been provided by a particular robot arm, that robot arm then reverts to its normal operation. Alternatively, in the event that a first robot arm breaks down or needs servicing, a further arm can be configured to attach two teat cups for a longer period, perhaps to allow servicing of one robot arm without interrupting the milking process.

The robot arms 100, 200, 300, 400 may be provided with one or more proximity sensors which detect when the robot arm is in close proximity to, for example, the leg of a cow 7 or an item of milking equipment.

Robot arms 100, 200, 300, 400 are relatively simple in design, since each one requires only limited range and freedom of movement. As shown and described, each arm 100, 200, 300, 400 is extendible but, as mentioned above, this is not an essential feature. Prior robots used in the milking industry with up to six or seven axes of movement are not required in the milking parlours described herein due to the benefits provided by the present invention.

However, a robot arm having six or seven axes of movement may be used in the place of at least one of the schematic robot arms 100, 200, 300, 400 specifically described above. The additional axes of movement are of particular assistance in avoiding the legs of a cow and/or milking equipment such as a further robot arm (as detected by a proximity sensor on the robot arm). The additional flexibility of movement provided allows two robot arms to more readily avoid one another and generally move in a coordinated fashion. As described above, there is less need for this freedom of movement as a result of the arrangement of the present invention. However, it may be preferable that one or more of the later robot arms, e.g. the fourth arm 400 and/or the third arm 300, have greater flexibility/freedom of movement, as these arms are more likely to have to cooperate with other arms and/or re-attach detached teat cups as described above. As an example, the first three arms 100, 200, 300 could be very simple in design, while the fourth arm 400 may be a six or seven axis arm with increased freedom of movement to allow it to compensate more easily for any problems experienced by the other arms 100, 200, 300.

It will also be understood that, although not essential, any of the robot arms 100, 200, 300, 400 shown in FIG. 3 may be supported on a base moveable in the direction of arrow 11, for example, on a rail or on a telescopically extendable element. In this way, the robot arms 100, 200, 300, 400 of FIG. 3 may be moved in the general rotary direction of the platform 3 so as to provide additional time, if required, in order to complete a servicing activity.

In this latter regard, the swivel unit 64 of each robot arm 100, 200, 300, 400 may be mounted on a telescopically extendable element which itself is mounted to the parlour floor by means of a base unit. It will be understood that the platform 3 rotates past each base unit which remains in a fixed location in the parlour 1. Each extendable element is telescopically extendable in a generally tangential direction relative to the platform 3. Each robot arm 100, 200, 300, 400 may be thereby moved along a part circular path with the platform 3 so that the position of the robot arm 100, 200, 300, 400 relative to a particular milking stall 5 may be maintained through a predetermined angle of platform rotation. It will be understood that this angle is, in part, determined by the extent to which the telescopic element may be extended. Furthermore, in order to assist in maintaining a constant relative position between each robot arm 100, 200, 300, 400 (specifically, the swivel unit 64) and the associated stall 5, the relevant base unit may be rotatable so as to allow the extendable element 34 to rotate in a plane parallel with the parlour floor.

In the embodiments described above wherein robot arms are positioned so as to operate in close proximity to one another, it will be understood that a common volume will exist which is within the working/operating range of each robot arm such that a collision between the arms is possible. This common volume is considered by the electronic control system as a plurality of sub-volumes (for example, a matrix of sub-volumes). If a robot arm is moved to locate in one or more of these sub-volumes, then the control system will ensure that the other robot arm is moved in such a way so as to not be located in these sub-volumes. In this way, more than one robot arm is prevented from being located in a given sub-volume at the same time. In order to ensure adequate clearance between robot arms, the electronic control system may prevent a robot arm from moving into a sub-volume adjacent a sub-volume occupied by another robot arm.

It will be understood that each robot arm may send electronic signals conferring information regarding its activity. This information typically relates to the progress being made in completing a servicing task. The communication of this information may be made by a robot arm to a central electronic control system, which controls movement of several robot arms as described above. Alternatively, this information may be sent from a robot arm directly to one or more other robot arms so that each of these other robot arms may individually modify their own activity as deemed necessary in view of the received information. For example, the information transmitted by a robot arm may relate to the current position of that arm. On receiving such information from a neighbouring robot arm, a further robot arm may determine that its own movement should be modified in order to avoid a collision with the neighbouring robot arm.

The present invention is not limited to the specific embodiments described above. Alternative arrangements will be apparent to a reader skilled in the art. For example, the invention may be used not only with Parallel Rotary parlours as described above, but also with Herringbone Rotary parlours. In either case the parlour may employ a stop/start or continuous platform movement system. Also, although the preferred embodiment above describes the use of four robots, one for each teat, it is possible to use just two robots. When just two robots are provided, one may be used to attach teat cups 21*d* and 21*c* to the front teats of a cow, and the other may be used to attach teat cups 21*b* and 21*a* to the rear teats of a cow. However, in an alternative embodiment having just two robots, one of the robots is used to attach teat cups 21*d* and 21*b* to the left teats of a cow, and the other of the robots is used to attach teat cups 21*c* and 21*a* to the right teats of a cow.

Additionally or alternatively, the teat cup carrying means may be capable of carrying more than one teat cup (for instance, two teat cups) simultaneously, whilst being capable of picking-up and/or attaching/putting down teat cups individually (i.e. one at a time). In this way, where two robots are used, the number of movements made by a robot arm from the teat cup magazine to the animal is reduced from two (when the teat cups are picked-up and moved individually) to one (when the teat cups are moved in pairs from the magazine to the animal). The teat cup carrying means may be provided with a plurality (e.g. two) of teat cup receivers for receiving a teat cup. Each receiver may be a gripper or may comprise an electro-magnet operable independently of electro-magnets associated with other receivers.

In a further alternative arrangement, each robot arm is provided with a means for sensing the location of a teat of an animal to be milked. This sensing means may be a conventional video camera 501,502 and/or some other optical sensor, such as a scanning laser positioning system. Ideally, the sensing means is a 3D (three-dimensional) camera, such as a time-of-flight camera. This type of camera provides for depth perception i.e. allows for the distance of objects within a scene to be determined. It will be understood therefore that the central control system will be provided with information from the sensing means relating to the area in the vicinity of the robot arm and, in particular, of the teat cup carrying means. Since the relative positions of the teat sensing means and the teat cup carrying means is known to the central control system, the central control system can be readily adapted to move the teat cup carrying means towards a teat sensed by the teat sensing means and thereby allow for the ready attachment of a teat cup to the sensed teat.

The way in which the teat sensing means is oriented relative to the robot arm and associated teat cup carrying means is dependent upon the particular teat of an animal which, in use, the robot arm is tasked to service. Typically, the rear two teats of a dairy cow are positioned slightly lower than the two forward teats. It will be appreciated therefore that the forward two teats in particular tend to be obscured by the other two teats when viewed from the rear of the animal. This can present teat sensing means with difficulties in sensing the forward teats from a location at the rear of an animal. Accordingly, teat sensing means may be oriented relative to a robot arm so as to take into account this potential problem.

Figure 4:
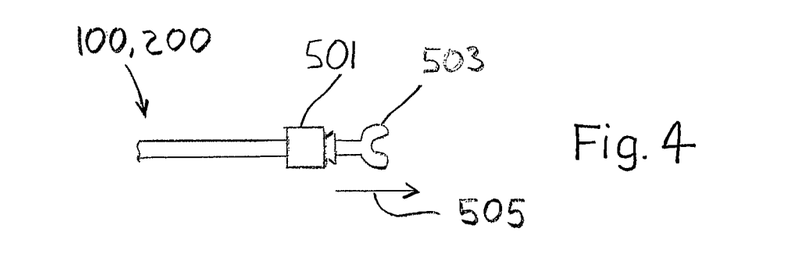
FIG. 4 is a schematic part plan view of a type of robot arm wherein the arm is provided with a forward facing camera.
Figure 5:
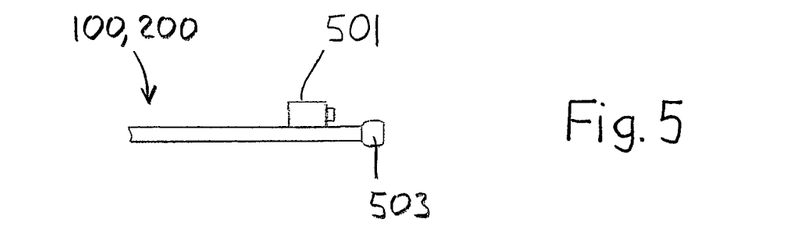
FIG. 5 is a schematic part side view of the type of robot arm shown in FIG. 4.
Figure 6:
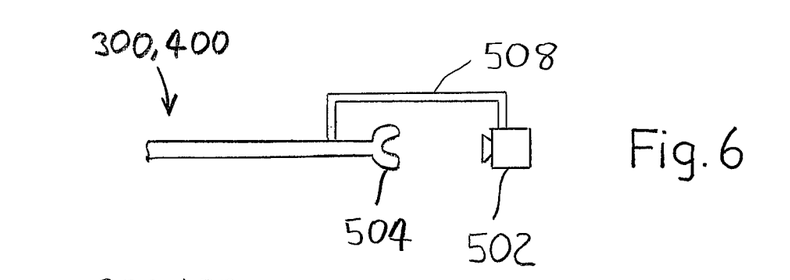
FIG. 6 is a schematic part plan view of a further type of robot arm wherein the arm is provided with a rearward facing camera.
Figure 7:
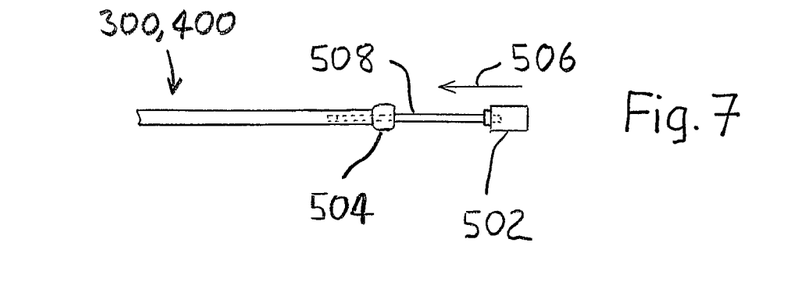
FIG. 7 is a schematic part side view of the type of robot arm shown in FIG. 6.

More specifically, the or each robot arm 100,200 tasked with attaching a teat cup to a rear teat (a first type of robotic manipulation device) may be provided with a teat sensing means 501 which faces forward when a teat cup is being moved into position and attached to a teat from the rear of the associated animal (see FIGS. 4 and 5). Also, the or each robot arm 300,400 tasked with attaching a teat cup to a forward teat (a second type of robotic manipulation device) may be provided with a teat sensing means 502 which faces backwards when a teat cup is being moved into position and attached to a teat from the rear of the associated animal (see FIGS. 6 and 7).

As shown in FIGS. 4 to 7 of the accompanying drawings, sensing means of the first type of robotic manipulation device 100,200 is located in a position relative to teat cup carrying means 503 (a gripper for a single teat cup) of the first type of robotic manipulation device 100,200 which is different to the position of sensing means 502 of the second type of robotic manipulation device 300,400 relative to the teat cup carrying means 504 (a gripper for a single teat cup) of the second type of robotic manipulation device 300,400. The different relative positions of the sensing means 501,502 of the two types of robotic manipulation device allows for the sensing means 501,502 to be provided with the best position for sensing a particular teat prior to and during the attachment of a teat cup to that teat. For example, the position of the sensing means 501,502 may be optimised so as to minimise the degree to which a teat to be serviced is obscured from the sensing means 501,502 (by, for example, another teat of the animal to be milked).

The sensing means 501 of the first type of robotic manipulation device 100 is arranged to sense in a first direction (indicate by arrow 505 in FIG. 4) relative to the first type of robotic manipulation device 100,200 and the sensing means 502 of the second type of robotic manipulation device 300 is arranged to sense in a second direction (indicate by arrow 506 in FIG. 7) relative to the second robotic manipulation device 100, wherein said first and second relative directions are opposite one another. It will be understood with reference to the accompanying drawings that, in the first type of manipulation device, the camera of the first sensing means views in one direction down the arm of said first type of device, whereas, in the second type of device, the camera of the second sensing means views in an opposite direction up the arm of said second type of device.

In the manner shown in FIG. 3, the robotic manipulation devices 100,200,300,400 are positioned relative to the platform 3 so that, in use, said devices 100,200,300,400 attach teat cups to the teats of an animal by extending from the rear of said animal. During use, the position and orientation of the sensing means relative to the associated teat cup carrying means is such that the sensing means 501 of the first type of robotic manipulation device 100,200 senses in a direction from a position at the rear of the animal's teats towards the front of the animal and the sensing means 502 of the second type of robotic manipulation device 300 senses in a direction from a position forward of the animal's teats towards the rear of the animal. Although the robotic manipulation devices will clearly manouvre from one position to another in the course of extending between the legs of the animal and acquiring a suitable position for teat cup attachment, the sensing means will continue sense in the general directions mentioned above because a movement of the robot arms from positions allowing such sensing does not tend to occur during attachment.

As will be seen from FIGS. 4 and 5, the sensing means of the first type of robotic manipulation device 100,200 is positioned on one side (in the present embodiment, to the rear) of the teat cup carrying means 503 of the first type of robotic manipulation device and oriented so as to view said teat cup carrying means 503. As will be seen from FIGS. 6 and 7, the sensing means 502 of the second type of robotic manipulation device 300,400 is positioned on a side (in the present embodiment, to the front) of the teat cup carrying means 504 of the second type of robotic manipulation device 300,400 and oriented so as to view said teat cup carrying means of the second type of robotic manipulation device 300,400. It will be understood therefore that said side of the first teat cup carrying means is a different side to said side of the second teat cup carrying means. The first sensing means 501 is mounted directly on the arm of the first type of robotic manipulation device 100,200 and, of course, to the rear of the teat cup carrying means 503. However, in order to position the second sensing means 502 in front of the teat cup carrying means 504, the second sensing means 502 is mounted on a bracket or secondary arm 508 which is itself mounted on the arm of the robotic manipulation device 300,400 and extends forward past the teat cup carrying means 504.

For the sake of clarity, a milking parlour may comprise two of said first type of robotic manipulation device and two of said second type of robotic manipulation device. Also, the term sensing direction is used to refer to the direction from the sensing means to region which is sensed by the sensing means.

The invention claimed is:

1. A milking parlour (1), comprising:
   a rotatable platform (3) comprised of plural milking stalls (5), each milking stall having a set of teat cups (23), each set of teat cups (23) comprised of at least a first sub-set of the teat cups (21d) and a second sub-set of the teat cups (21c), the first and second sub-sets being mutually exclusive;
   a first robotic manipulation device (100);
   a second robotic manipulation device (200); and
   a plurality of milking stalls (5) provided on the platform (3) moveable relative to the first and second robotic manipulation devices (100,200), wherein,
   the first and second robotic manipulation devices (100, 200) are positioned and controlled so that the first and second robotic manipulation devices (100,200) simultaneously service neighbouring milking stalls (5) on the platform (3) where the first robotic manipulation device (100) attaches the first sub-set of the teat cups (21d) to a first animal in a first milking stall (5) simultaneously while the second robotic manipulation device (200) attaches the second sub-set of the teat cups (21c) to a second animal (7) in a neighbouring second milking stall (5), and the first and second robotic manipulation devices (100, 200) are positioned and controlled so that the first and second robotic manipulation devices (100,200) service neighbouring milking stalls (5) on the platform (3) where the first robotic manipulation device (100) attaches only the first sub-set of the teat cups (21d) to the first animal in the first milking stall (5), and the second robotic manipulation device (200) attaches the second sub-set of the teat cups (21c) to the first animal (7) in the first milking stall (5), wherein both the first and second robotic manipulation devices (100,200) attach teat cups to teats of the first animal.

2. The milking parlour according to claim 1, further comprising a third robotic manipulation device (300) and a fourth robotic manipulation device (400), wherein, each set of teat cups (23) comprises the first sub-set of the teat cups (21d), the second sub-set of the teat cups (21c), a third sub-set of the teat cups (21d), a fourth sub-set of the teat cups (21a), wherein the first, second, third, and fourth sub-sets being mutually exclusive of each other;

the first, second, third, and fourth robotic manipulation devices (100,200,300,400) are positioned and controlled so that the first, second, third, and fourth robotic manipulation devices are controlled to simultaneously service neighbouring milking stalls (5) on the platform (3), the third robotic manipulation device (300) is configured to attach the third sub-set of the teat cups (21b) to the first animal in the first milking stall (5), and the fourth robotic manipulation device (400) is configured to attach the fourth sub-set of the teat cups (21a) to the first animal (7) in the first milking stall (5).

3. The milking parlour according to claim 2, wherein the third robotic manipulation device (300) is operatively connected to perform the teat cup attaching function of the second and third robotic manipulation devices (200, 400).

4. The milking parlour according to claim 2, wherein the fourth robotic manipulation device (100,200) is further operatively controlled to attach both any fallen teat cup and any previously unattached teat cup of the first sub-set, the second sub-set and the third sub-set of teat cups (21c) to the first animal.

5. The milking parlour according to claim 1, further comprising:

an electronic control system for controlling movement of each robotic manipulation device (100,200), wherein information regarding activity of each robotic manipulation device (100,200) is sent electronically from each said robotic manipulation device, and wherein said information comprises data recording at least one of i) a current real-time position of the robotic manipulation device (100,200) and ii) a number of teat cups (21) successfully attached to an animal positioned in a milking stall currently being serviced by one of the robotic manipulation devices (100,200).

6. The milking parlour according to claim 1, further comprising an electronic control system operatively arranged to determine a position of each robotic manipulation device (100,200) and determine movement of each robotic manipulation device so as to avoid said robotic manipulation devices colliding with one another.

7. The milking parlour according to claim 6, wherein a common operating volume within a working range of both the first and second robotic manipulation devices (100,200) is considered by the electronic control system as a plurality of sub-volumes, said control system preventing more than one robotic manipulation device from locating in the same sub-volume at the same time.

8. The milking parlour according to claim 1, wherein, the first robotic manipulation device (100) comprises means for carrying a teat cup and means for sensing the location of a teat relative to said teat cup carrying means, the second robotic manipulation device (200) comprises second means for carrying a teat cup and means for sensing the location of a teat relative to said second teat cup carrying means, and the relative position of said sensing means of the first robotic manipulation device (100) to the teat cup carrying means of the first robotic manipulation device (100) is different to the relative position of said sensing means of the second robotic manipulation device (300) to the teat cup carrying means of the second robotic manipulation device (300).

9. The milking parlour according to claim 8, wherein the sensing means of the first robotic manipulation device (100) is arranged to sense in a first direction relative to the first robotic manipulation device (100) and the sensing means of the second robotic manipulation device (300) is arranged to sense in a second direction relative to the second robotic manipulation device (100), wherein said first and second relative directions are opposite one another.

10. The milking parlour according to claim 8, wherein, the first and second robotic manipulation devices (100, 300) are positioned relative to the platform (3) so that, in use, said devices (100,300) attach teat cups to the teats of an animal from the rear of said animal, and in use, the sensing means of the first robotic manipulation device (100) senses in a direction from a position at the rear of said animal's teats generally towards the front of the animal and the sensing means of the second robotic manipulation device (300) senses in a direction from a position forward of said animal's teats generally towards the rear of the animal.

11. The milking parlour according to claim 10, wherein, the first sub-set of the teat cups (21d) corresponds to a rear teat of the animal, and the second sub-set of the teat cups (21c) corresponds to a front teat of the animal.

12. The milking parlour according to claim 8, wherein, the sensing means of the first robotic manipulation device (100) is positioned on one side of the teat cup carrying means of the first robotic manipulation device (100) and oriented so as to sense in the general direction of said teat cup carrying means, the sensing means of the second robotic manipulation device (300) is positioned on one side of the teat cup carrying means of the second robotic manipulation device (300) and oriented so as to sense in the general direction of said teat cup carrying means of the second robotic manipulation device (300), and said one side of the first teat cup carrying means is a different side to said one side of the second teat cup carrying means.

13. The milking parlour according to claim 8, comprising two of said first robotic manipulation devices and two of said second robotic manipulation devices.

14. The milking parlour according to claim 8, wherein each sensing means comprises a time-of-flight camera.

15. The milking parlour according to claim 1, further comprising:
an electronic control system for controlling movement of each robotic manipulation device (100,200),
wherein the electronic control system is operatively configured for controlling movement of each robotic manipulation device (100,200) so that
i) after the first robotic manipulation device completes the servicing of the first milking stall (S15) and before the second robotic manipulation device completes servicing of the second milking stall (S15), the first robotic manipulation device begins servicing a third milking stall (S14) without waiting for second robotic manipulation devices to complete the servicing of the second milking stall (S16).

16. The milking parlour according to claim 1, further comprising:
an electronic control system for controlling movement of each robotic manipulation device (100, 200),
wherein the electronic control system is operatively configured for controlling movement of each robotic manipulation device (100,200) so that
i) after the second robotic manipulation device completes the servicing of the second milking stall (S16) and before the first robotic manipulation device completes servicing of the first milking stall (S15), the second robotic manipulation device begins servicing the first milking stall (S15) without waiting for first robotic manipulation devices to complete the servicing of the first milking stall (S15), and
ii) after the first robotic manipulation device completes the servicing of the first milking stall (S15) and before the second robotic manipulation device completes servicing of the second milking stall (S16), the first robotic manipulation device begins servicing a third milking stall (S14) without waiting for second robotic manipulation devices to complete the servicing of the second milking stall (S16).

17. A method of operating a milking parlour (1), comprising a rotatable platform (3) with plural milking stalls (5), each milking stall having a set of teat cups (23), each set of teat cups (23) comprised of at least a first sub-set of the teat cups (21d) and a second sub-set of the teat cups (21c); a first robotic manipulation device (100); a second robotic manipulation device (200); and a plurality of milking stalls (5) provided on the platform (3) moveable relative to the first and second robotic manipulation devices (100,200), wherein, the first and second robotic manipulation devices (100,200) are positioned and controlled so that the first and second robotic manipulation devices (100,200) are operable to simultaneously service neighbouring milking stalls (5) on the platform (3), said method comprising the steps of:
operating the first robotic manipulation device (100) to attach the first sub-set of the teat cups (21d) to a first animal in a first milking stall (5) while simultaneously operating the second robotic manipulation device (200) to attach the second sub-set of the teat cups (21c) to a second animal (7) in a neighbouring second milking stall (5); and
operating the first robotic manipulation device (100) to attach only the first sub-set of the teat cups (21d) to the first animal in the first milking stall (5), and operating the second robotic manipulation device (200) to attach the second sub-set of the teat cups (21c) to the first animal (7) in the first milking stall (5).

18. The method according to claim 17, wherein, after the first robotic manipulation device completes the servicing of the first milking stall (S15) and before the second robotic manipulation device completes servicing of the second milking stall (S16), the first robotic manipulation device begins servicing a third milking stall (S14) without waiting for second robotic manipulation devices to complete the servicing of the second milking stall (S16).

19. The method according to claim 17, wherein, after the second robotic manipulation device completes the servicing of the second milking stall (S16) and before the first robotic manipulation device completes servicing of the first milking stall (S15), the second robotic manipulation device begins servicing the first milking stall (S15) without waiting for first robotic manipulation devices to complete the servicing of the first milking stall (S15).

* * * * *